(12) United States Patent
Chen et al.

(10) Patent No.: US 7,841,759 B2
(45) Date of Patent: Nov. 30, 2010

(54) LED BACKLIGHT FOR DISPLAY SYSTEMS

(75) Inventors: Wei Chen, Palo Alto, CA (US); Jun Qi, Corona, CA (US); Victor Yin, Cupertino, CA (US); John Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 11/870,360

(22) Filed: Oct. 10, 2007

(65) Prior Publication Data

US 2009/0097271 A1    Apr. 16, 2009

(51) Int. Cl.
F21V 33/00    (2006.01)

(52) U.S. Cl. ..................... 362/612; 362/800

(58) Field of Classification Search ............ 362/800, 362/611–613
See application file for complete search history.

(56) References Cited

U.S. PATENT DOCUMENTS

| | | | |
|---|---|---|---|
| 5,803,579 A | 9/1998 | Turnbull et al. |
| 6,132,072 A | 10/2000 | Turnbull et al. |
| 6,243,068 B1 | 6/2001 | Evanicky et al. |
| 6,448,955 B1 | 9/2002 | Evanicky et al. |
| 6,523,976 B1 | 2/2003 | Turnbull et al. |
| 6,854,854 B2 | 2/2005 | Hoelen et al. |
| 7,002,546 B1 | 2/2006 | Stuppi et al. |
| 7,205,719 B2 | 4/2007 | Tain et al. |
| 7,220,039 B2 | 5/2007 | Ahn et al. |
| 2002/0135997 A1 | 9/2002 | Lammers |
| 2005/0001537 A1 | 1/2005 | West et al. |
| 2005/0135094 A1 | 6/2005 | Lee et al. |
| 2007/0046485 A1 | 3/2007 | Grootes et al. |
| 2007/0110386 A1 | 5/2007 | Chiang |
| 2007/0124122 A1 | 5/2007 | Freier |
| 2007/0189037 A1 | 8/2007 | Ahn et al. |
| 2007/0201226 A1 | 8/2007 | Nishigaki |
| 2007/0274093 A1 | 11/2007 | Haim et al. |

OTHER PUBLICATIONS

International Search Report and Written Opinion for PCT/US2008/075874, mailed Feb. 4, 2009, 10 pages.

*Primary Examiner*—Laura Tso
(74) *Attorney, Agent, or Firm*—Morrison & Foerster LLP

(57) ABSTRACT

An LED backlight method and apparatus for display systems provides a plurality of light emitting diodes having different white point colors. At least two of the light emitting diodes having different white point colors are selected to produce a light of a predetermined white point color when the light outputs of the selected light emitting diodes are mixed. The selected light emitting diodes are mounted on a display panel in a predetermined order at spatially distributed positions for mixing their light outputs to produce the light of the predetermined white point color to illuminate the display panel with the light of the predetermined white point color.

21 Claims, 11 Drawing Sheets

LED BACKLIGHT FOR DISPLAY SYSTEMS

TECHNICAL FIELD

The present invention relates generally to device display systems, and more particularly to an LED backlight with highly uniform color for illuminating display systems.

BACKGROUND ART

As computer technology has advanced, the demand for portable computer systems, such as laptops, has increased. Portable computers have dramatically increased the mobility of computing power for the computer user. Since the first portable computer, manufacturers have increased computer mobility by decreasing the size, weight, and power demands of portable computers, increasing battery life, and increasing performance.

The monitors presently used contribute greatly to the overall size and weight of the portable computer. The monitor must be of a sufficient size, brightness, and clarity to provide the user with readable images. In order to achieve these requirements, monitors place a large demand on available power resources and are therefore a significant contributor indirectly as well as directly to the weight of the portable computer.

Typically, portable computer monitors utilize a liquid crystal display system. The liquid crystal display systems typically include a top plastic or glass panel and a bottom plastic or glass panel, having a liquid crystal display of thin film transistors and liquid crystal material in between. These systems also utilize a backlight system that typically includes a diffuser for passing light evenly to the liquid crystal display, a cold cathode fluorescent lamp ("CCFL") for producing light, a reflector for directing the light toward the diffuser, and a light pipe located between the diffuser and the reflector to spread light to the entire surface of the diffuser.

The use of conventional CCFL liquid crystal display systems in the monitors of portable computers, however, creates a limiting factor in the continuing effort to reduce the size and weight of portable computers. CCFL technology has not kept pace with advances in other technologies that have reduced the size and weight of many of the other display components. Today, one of the major limitations in further reducing the thickness and weight of the display is therefore the CCFL illumination system.

Light-emitting diode ("LED") technology offers attractive alternatives to the CCFL. LEDs are much thinner than the CCFL and do not require many of the weighty power supply systems of the CCFL. Compared to backlights using CCFLs, backlights with LEDs have many benefits, including lighter weight, higher brightness, higher color purity, larger color gamut, longer lifetime, and mercury-free composition. However, while a single CCFL can light an entire display, multiple LEDs are needed to light comparable displays.

A challenge with utilizing multiple LEDs, particularly when distributed in large arrays, is maintaining uniformity of color throughout the large number of LEDs. The color balance and spectra of the LEDs is governed by numerous factors such as manufacturing variances and the LED phosphorescence. For example, white LEDs are often actually blue LEDs with a complimentary yellow phosphor dot on the front of the LED. Depending upon manufacturing precision (and thus, related manufacturing costs), actual colors may therefore vary from, for example, slightly blue to slightly pink, often following a distribution curve in which many of the LEDs vary from the desired white point color. This can have a negative impact on the color uniformity of LCD displays. Understandably, reducing or compensating for such variability increases costs and complexity significantly as the number of LEDs increases in larger display configurations and environments.

One solution is to select and utilize only those LEDs that provide the desired white point color. Such a solution, however, causes costs to be very high since only a fraction of the LED production can be utilized.

Another solution is to compensate for LED color variations, such as by matching LEDs to one another and then filtering the light output to adjust the color to the desired white point color. This reduces the overall cost of the LEDs since most or all of the LEDs can be utilized. However, the additional color filters represent costly additional physical elements, oftentimes requiring a large number of available filter colors of finely varying shades and gradations. It can also increase the thickness of the display. An additional disadvantage is that such filters absorb light, causing the net brightness of the LED light sources to be reduced.

Thus, if LEDs are to become a viable alternative to CCFLs, an economical and practical solution must be found to utilize a large number of non-matching LEDs while maintaining uniformity of color in the display panels in which the LEDs are utilized.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

SUMMARY OF THE INVENTION

The present invention provides an LED backlight method and apparatus for display systems. A plurality of light emitting diodes having different white point colors is provided. At least two of the light emitting diodes having different white point colors are selected to produce a light of a predetermined white point color when the light outputs of the selected light emitting diodes are mixed. The selected light emitting diodes are mounted on a display panel in a predetermined order at spatially distributed positions for mixing their light outputs to produce the light of the predetermined white point color to illuminate the display panel with the light of the predetermined white point color.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION OF THE INVENTION

Figure 1:
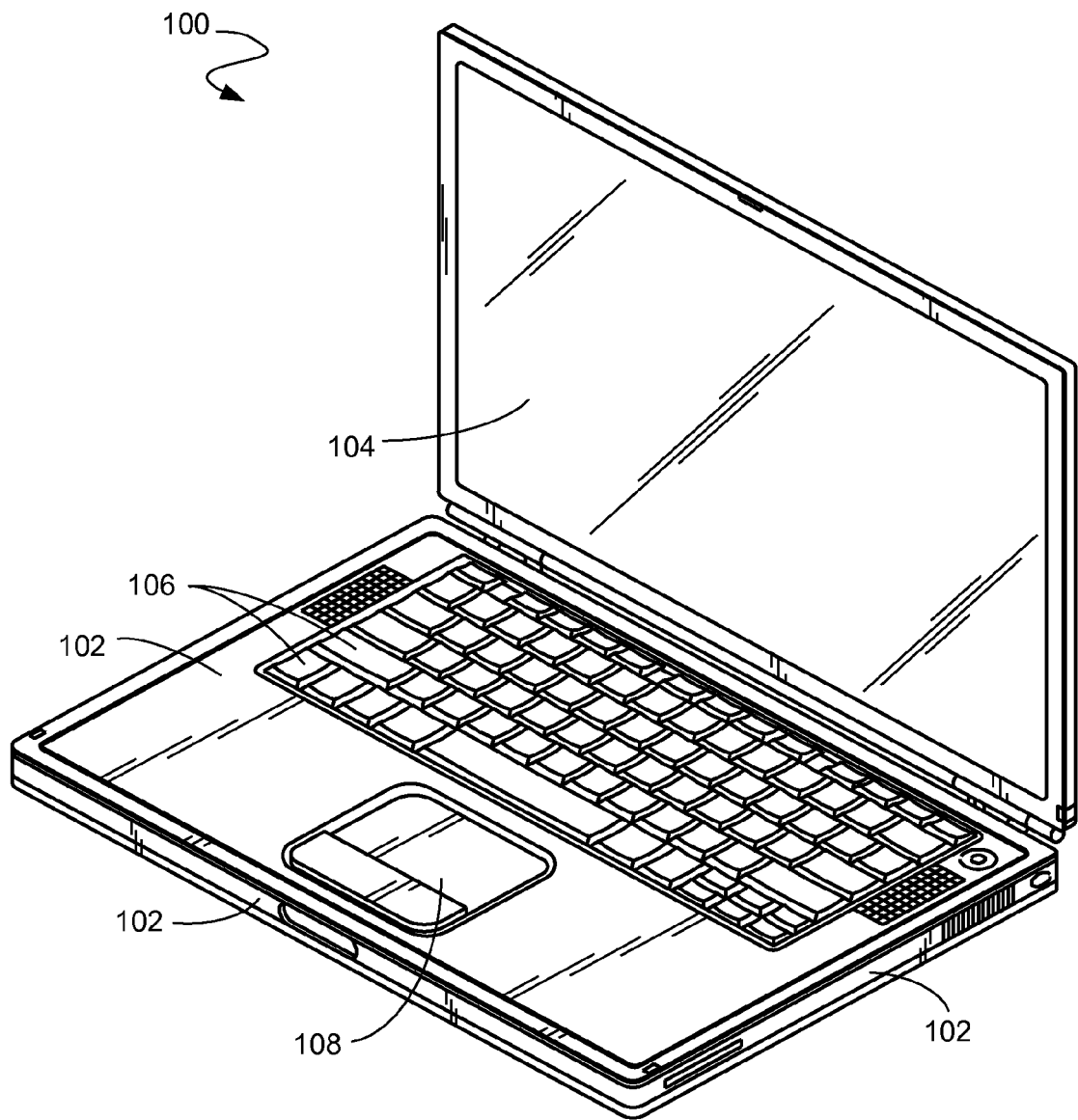
FIG. 1 is a view of a portable computer incorporating a panel illuminated by LEDs selected and mounted according to the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, the drawings showing embodiments of the system are semi-diagrammatic and not to scale and, particularly, some of the dimensions are for the clarity of presentation and are exaggerated in the drawing FIGs. Likewise, although the views in the drawings for ease of description generally show similar orientations, this depiction in the FIGs. is arbitrary for the most part. Generally, the invention can be considered, understood, and operated in any orientation.

In addition, where multiple embodiments are disclosed and described having some features in common, for clarity and ease of illustration, description, and comprehension thereof, similar and like features one to another will ordinarily be described with like reference numerals.

For expository purposes, terms, such as "above," "below," "bottom," "top," "side" (as in "sidewall"), "higher," "lower," "upper," "over," and "under," are defined with respect to the back of the display device except where the context indicates a different sense. The term "on" means that there is direct contact among elements.

Referring now to FIG. 1, therein is shown a portable computer 100 having a base 102 attached to a screen or panel 104. In this embodiment, the base 102 contains most of the components of the portable computer 100 such as a keyboard 106, a trackpad 108, a disk drive (not shown), and the motherboard (not shown). The panel 104 is illuminated by light-emitting diodes ("LEDs") (not shown, but see the LEDs 306 in FIG. 3) selected and mounted according to the present invention.

Figure 2:
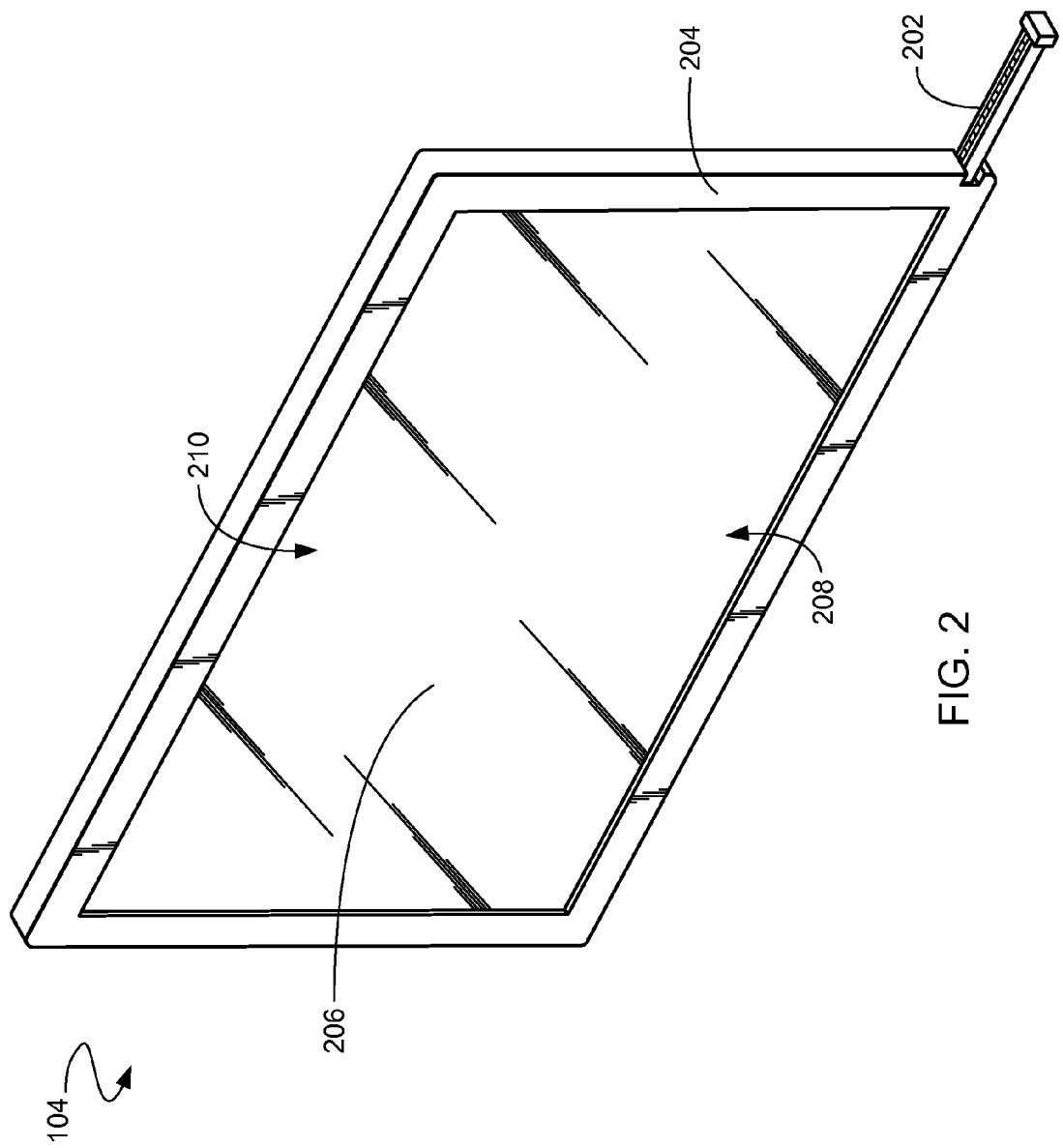
FIG. 2 is an enlarged detail from FIG. 1 of the panel with the removable light strip.

Referring now to FIG. 2, therein is shown a close-up of the panel 104. In this embodiment the panel 104 is a liquid crystal display ("LCD"). The panel 104 is electrically connected by suitable connectors (not shown, but see the power feed contact 318, FIG. 3) to a removable light strip 202. The removable light strip 202, which is shown partially inserted into the panel 104, illuminates the panel 104 from the base or bottom thereof. When fully inserted into the panel 104, the removable light strip 202 is retained therein by a suitable retaining means, such as a detent, latch, and so forth (not shown).

The panel 104 includes a bezel 204 that surrounds the active area 206 of the panel 104. The active area 206 is the illuminated portion in which the images are displayed, the removable light strip 202 being located behind the bezel 204 below the active area 206. The region of the active area 206 nearer the removable light strip 202, toward the bottom of the panel 104, then constitutes the near field 208 of the active area 206. Similarly, the region of the active area 206 farther from the removable light strip 202, toward the top of the panel 104, constitutes the far field 210 of the active area 206.

Figure 3:
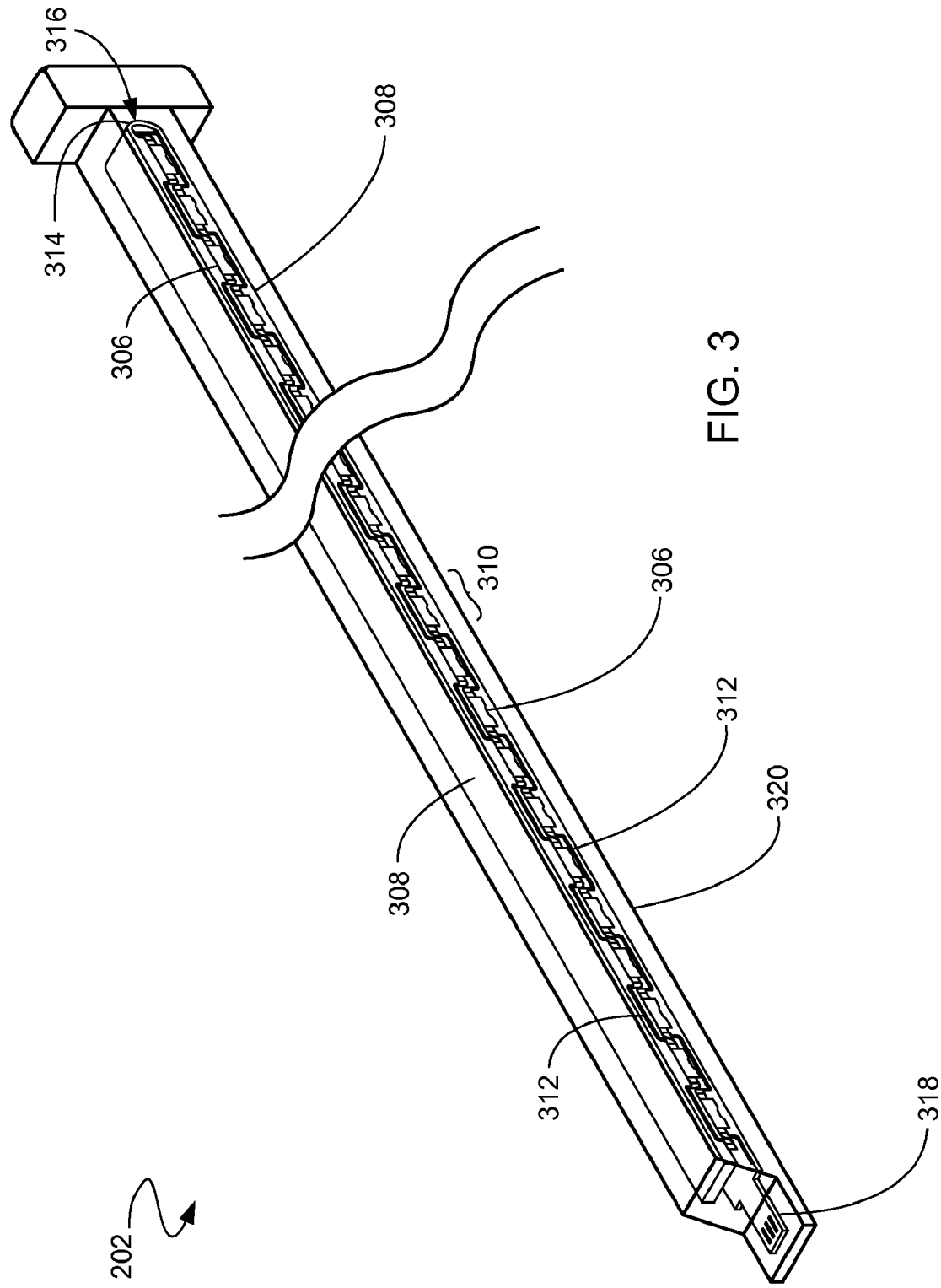
FIG. 3 is an enlarged detail from FIG. 2 of the removable light strip.

Referring now to FIG. 3, therein is shown a close-up of the removable light strip 202. In this embodiment, side firing LEDs 306 are mounted on and electrically connected to one another on a flex 308. The flex 308 is a conventional flexible medium onto which electrical components and connections are mounted. The LEDs 306 are spaced a distance 310 from each other. The distance 310 is equal to or greater then the length of the LEDs 306 and forms alignment areas 312. In this embodiment, the flex 308 has a fold 314 where the flex 308 is folded back on itself to form a folded flex 316. The folded flex 316 has a power feed contact 318 that connects (not shown) to the panel 104 (FIG. 2) when inserted into the panel 104. The folded flex 316 is encased in an assembly housing 320. The assembly housing 320 provides support for the folded flex 316, the LEDs 306, and the power feed contact 318.

LEDs, such as the LEDs 306, are point-light sources. Therefore when illuminating a panel with LEDs, it is generally preferable to use many spatially distributed LEDs to efficiently and economically obtain uniform illumination of the panel. Desired brightness levels are much more readily and economically obtained as well through the use of multiple LEDs, since LED costs increase dramatically with higher individual output light levels.

In order to achieve uniform and economical lighting across the panel 104, the multiple LEDs 306 must effectively provide a uniform color. The color balance and spectra of the LEDs 306 is limited by the phosphorescence. For example, white LEDs are often actually blue LEDs with a complimentary phosphor dot on the front of the LED. Depending upon manufacturing precision (and thus, related manufacturing costs), actual colors may vary from, for example, slightly blue to slightly pink. Understandably, reducing or compensating for such variability increases cost and complexity significantly as the number of LEDs increases in larger display configurations and environments. Prior solutions have therefore attempted to improve manufacturing processes and controls to produce highly uniform LEDs. Unfortunately, this has resulted in high production costs and significant waste when non-compliant LEDs could not be used and were rejected (thereby further increasing costs).

Figure 4:
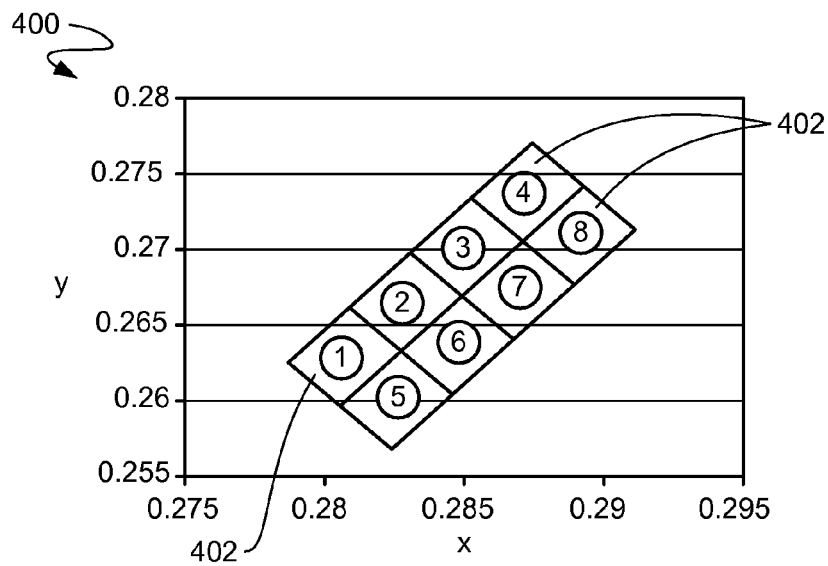
FIG. 4 is a representative LED color binning chart.

Referring now to FIG. 4, therein is shown a representative LED color binning chart 400 or color bin map of LEDs such as from a commercial LED manufacturer. Using this or a similar chart, production LEDs are sorted into groups of substantially matching colors, each group having different white point colors. That is, all LEDs having matching properties (e.g., color, brightness, forward voltage, flux, tint) that fall within the same small region or "bin" 402 of the color binning chart 400 are sorted together with others having the same properties. As previously suggested, only a few of the bins 402, located around a particular desired white point color, have LEDs contained therein that have been traditionally considered acceptable for production displays. LEDs sorted into other bins have been regarded as unacceptable or unusable, since the color differences are easily detected by the human eye. Thus, in order to assemble a high color uniformity LED backlight, only one or limited color bins can be used in a particular display model, which increases the difficulty and cost of the backlight units.

As is well known in the art, in the science of lighting there is a continuum of colors of light that can be called "white." One set of colors that deserve this description are the colors emitted, via the process called incandescence, by a black body at various relatively high temperatures. For example, the color of a black body at a temperature of 2848 kelvins ("K") matches the white light produced by domestic incandescent light bulbs. It is said that the color temperature of such a light bulb is 2848 K. The white light used in theatre illumination has a color temperature of about 3200 K. Daylight white light has a nominal color temperature of 5400 K (called equal energy white), but can vary from a cool, slightly reddish hue up to a bluish 25,000 K. Not all black body radiation can be considered white light: the background radiation of the universe, to name an extreme example, is only a few kelvins and is quite invisible.

Standard whites are often defined with reference to the chromaticity diagram of the International Commission on Illumination ("CIE"). These are the D series of standard illuminants. Illuminant D65, originally corresponding to a color temperature of 6,500 K, is taken to represent standard daylight.

Computer displays often have a color temperature control, allowing the user to select the color temperature (usually from a small set of fixed values) of the light emitted when the computer produces the electrical signal corresponding to "white." The RGB coordinates of white are 255 255 255, regardless of the color temperature that is actually selected for white.

It has been unexpectedly discovered, according to the present invention, that color balance and uniformity across different production displays can be maintained while using LEDs with wide variations in white point colors, thereby utilizing substantially all of the bins 402.

More particularly, according to the present invention, to achieve color balance and uniformity, LEDs with various white points are first sorted and binned into the bins 402, as before. The sorted LEDs within each bin 402 produce substantially the same white point as others within the same group or bin 402. Different bins, in turn, each have their own, different white points since the actual production LEDs, in the aggregate, show slight color variations around the desired white point color for the production displays. Then, as taught herein according to embodiments of the present invention, the LEDs from these various bins are successfully utilized by carefully selecting and physically mounting, distributing, and locating particular LEDs having different white point colors, from carefully selected bins 402, in selected locations in the display adjacent the display panel. The LEDs are arranged in a set order in spatially distributed positions for mixing their light outputs to provide complementary colors that combine in the display to provide a light of the desired white point color for illuminating the entire display panel, including both the near field 208 (FIG. 2) and the far field 210 (FIG. 2), with the light of the predetermined white point color. The LEDs 306 are selected from the bins 402 in this fashion, and as more particularly described herein, thus have the characteristics of having been selected from at least two different such bins 402.

In prior configurations employing matching LEDs of the same color, the color of the LED light source was of course consistently the same across the full display panel since all the LEDs matched. That condition does not necessarily obtain, however, when non-matching LEDs are utilized in physically distributed locations along the edge of the display panel. It therefore becomes a non-trivial task, unexpectedly solved by the present invention, to configure and arrange such non-matching LEDs so that both the near field 208 of the panel 104 (FIG. 2) and the far field 210 of the panel 104 consistently receive the same desired white point color illumination.

The present invention is thus a new approach to achieving high color uniformity LED backlight systems for LCD displays. By delicately selecting the order of the LED color bins 402 for the LEDs 306 (FIG. 3) that are assembled into the panel 104 backlight units, such as the light strip 202 (FIG. 2), the color difference on the backlight units can be well balanced and high color uniformity can be achieved. As taught herein, the specific bin 402 order of the LEDs 306 can be optimized through computer color simulations.

Such a color simulation according to an embodiment of the present invention is described as follows. First, it is assumed that the color mixing between the different LED bins follows the color addition rules:

$$x = \sum_j I_j x_j \bigg/ \sum_j I_j \qquad (1)$$

$$y = \sum_j I_j y_j \bigg/ \sum_j I_j$$

where $I_j$, $x_j$, and $y_j$ are the brightness contribution and color coordinates in CIE 1931 of jth LED, respectively. This assumption is valid for LEDs from the same manufacturer, since the spectra of such LEDs are similar and the color difference is small.

The brightness contribution is assumed to be a Gaussian-type:

$$I(d) = \exp[-d^2/(2\sigma^2)] \qquad (2)$$

where d is the horizontal distance from the LED and σ is a mixing power parameter related to the distance L between LEDs, the properties of the backlight system, and the position on the panel.

Figure 5:
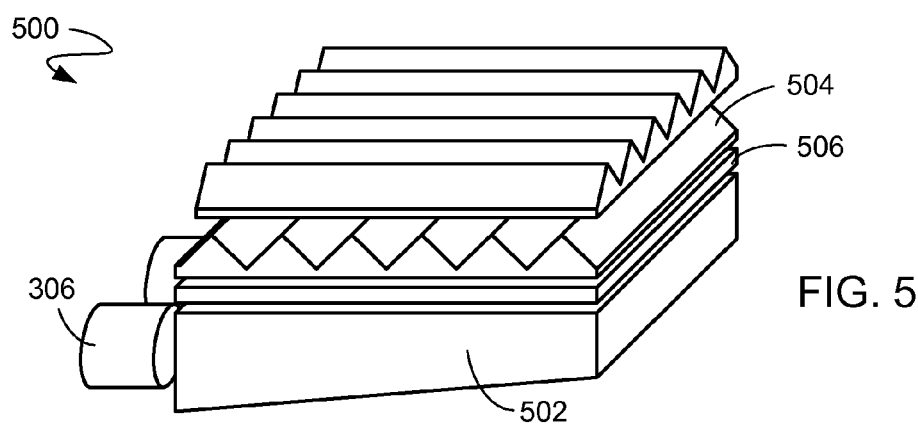
FIG. 5 is a schematic illustration of a light distribution system for an edge-lit backlight for a panel.

Referring now to FIG. 5, therein is shown a schematic illustration 500 of a light distribution system for an edge-lit backlight for a panel such as the panel 104 (FIG. 2). In the illustrated light distribution system, light emitted from the LEDs 306 is incident on and mixes inside a light guide plate ("LGP") 502. A brightness enhancement film ("BEF") 504 and diffuser film 506 collimate the light and provide high luminance at near normal viewing angles, with the LGP 502, the BEF 504, and the diffuser film 506 all functioning as light mixing elements. The farther that the light travels in these elements, the better the mixing. In other words, the mixing power increases with increasing distance from the light source.

Figure 6:
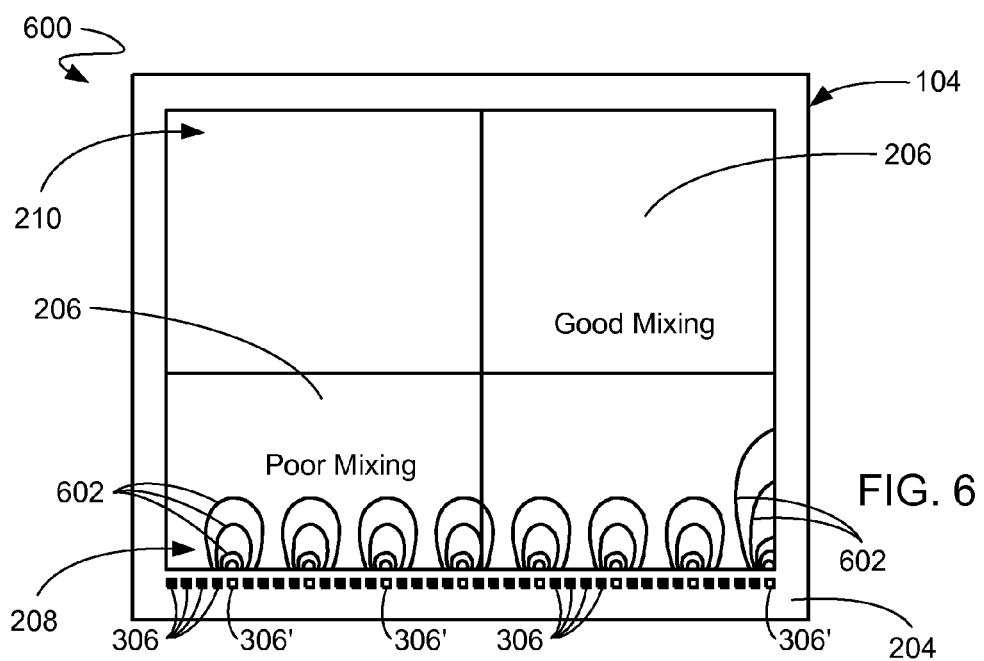
FIG. 6 is a brightness map comparison of a color simulation according to an embodiment of the present invention.

Referring now to FIG. 6, therein is shown a brightness map comparison 600 of a color simulation, according to an embodiment of the present invention, compared with real display systems. In this example, an LCD display panel 104 was tested having a light source of 40 LEDs 306. In this panel, the LEDs 306 were located behind the bezel 204 spaced at a distance from the edge of the active area 206 similar or comparable to the distance between adjacent LEDs 306. In other embodiments, the LEDs 306 may be spaced from each other at distances generally greater or less than their distance from the active area 206 of the display panel 104, depending upon the color differences, color mixing efficiencies, and desired performance specifications of the display. In this example, only 8 LEDs 306' in the 40 LED array are turned on (illuminated), alternately every fifth LED, for testing purposes in order to reveal more clearly the progression of the color mixing with increasing distance into the near field 208 and the far field 210.

The measured brightness through the whole active area 206 of the panel 104 is shown in FIG. 6 by isolumen lines 602. (The term "isolumen line" is a coined term defined and used herein to mean a line connecting points having the same luminous flux, analogous, for example, to the use of isobars on meteorological maps.) The closely spaced isolumen lines 602 in the near field 208 show that the mixing power is low in the near field 208 close to the LEDs 306. On the other hand, the lack of isolumen lines 602 in the far field 210 shows that the mixing is very good in the far field 210.

Figure 7:
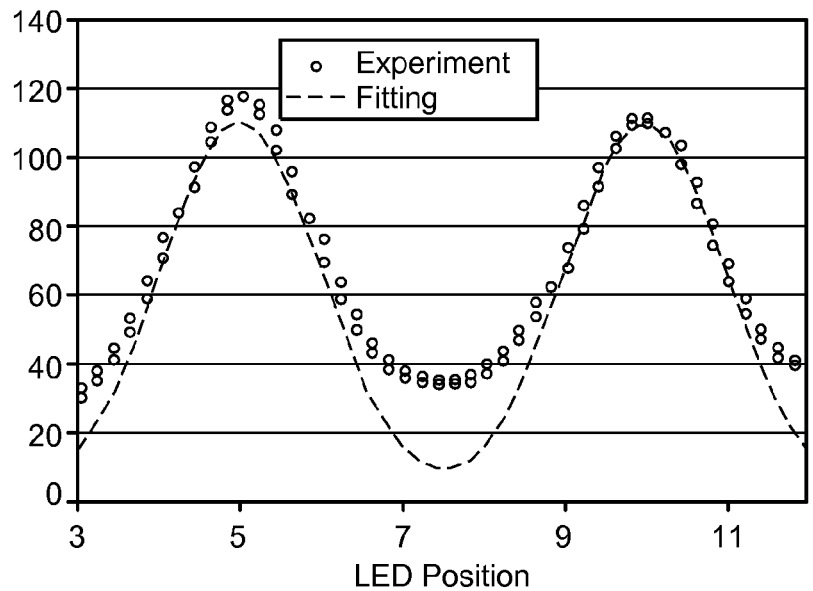
FIG. 7 shows brightness contribution details of the near field in FIG. 6.

Referring now to FIG. 7, therein is shown brightness contribution details of a portion of the near field 208 from FIG. 6, comparing the brightness contribution in the LCD panel 104 (FIG. 6) to a Gaussian-type simulation. In FIG. 7, the horizontal distance is measured in a natural unit; i.e., the distance between adjacent LEDs 306 (FIG. 6) is set to be 1. The fitting curve is calculated using equation (2) with σ=1.0. The simulation agrees well with the real system.

In the far field 210 (as shown in FIG. 6), the brightness is very uniform, which indicates that the mixing power is high and the brightness contribution function (equation 2) should be slowly varied (larger σ).

Figure 8:
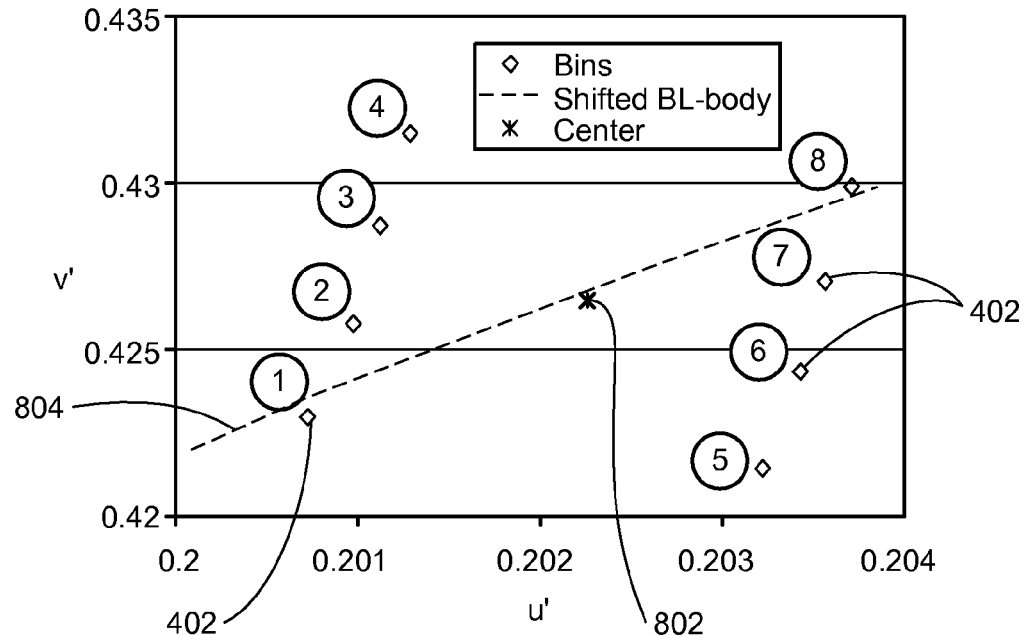
FIG. 8 illustrates optimized LED color mixing with eight color bins according to an embodiment of the present invention.

Referring now to FIG. 8, therein is shown computer simulation results 800, according to an embodiment of the present invention, that optimizes the LED color mixing with eight color bins 402. Two criteria choices are shown: (1) minimum distance to the center point 802 in CIE 1976 coordinates; (2) minimum distance to the shifted Black-Body curve 804 in CIE 1976 coordinates (it being noted that the shift can be restored by the design of a color filter in the LCD panels).

Figure 9A:
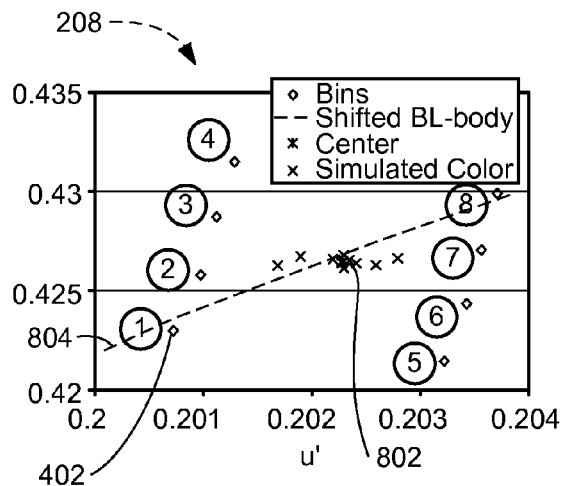
FIGS. 9A and 9B show, respectively, the simulated color distribution uniformity with optimized LED order results in the near field and the far field for optimization that minimizes the distance from the center point.
Figure 9B:
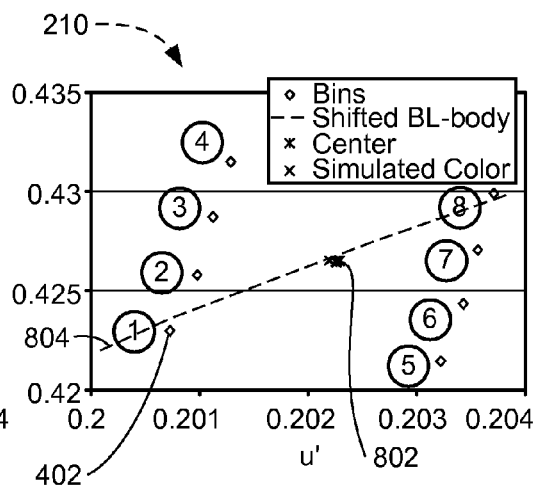

Referring now to FIGS. 9A and 9B, therein are shown, respectively, the simulated color distribution uniformity with optimized LED order results in the near field 208 (σ=1) and the far field 210 (σ=5). The optimization method is to minimize the distance from the center point 802 (expectation value). The optimal order of the LED bins 402 is (7 3 6 2 8 5 4 1)$_n$. FIGS. 9A and 9B show that both the color differences Δu', Δv' are smaller than 0.002, which are difficult for the human eye to separate.

Figure 10A:
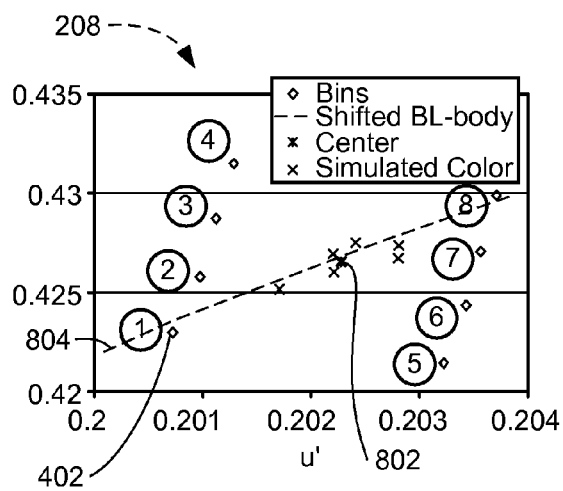
FIGS. 10A and 10B show, respectively, the simulated color distribution uniformity with optimized LED order results in the near field and the far field for optimization that minimizes the distance from the shifted Black-Body curve.
Figure 10B:
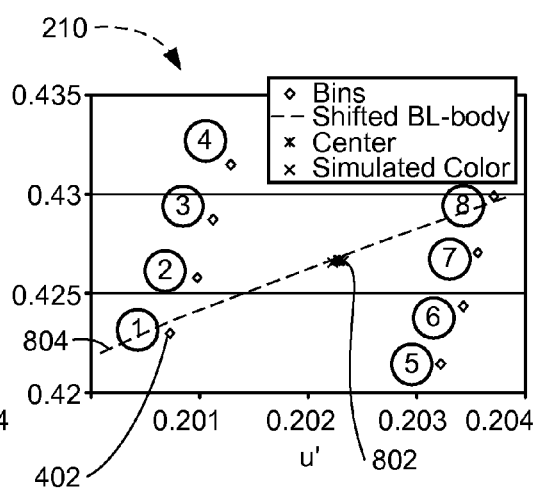

Referring now to FIGS. 10A and 10B, therein are shown, respectively, the simulated color distribution uniformity with optimized LED order results in the near field 208 and the far field 210. The optimization method is to minimize the distance from the shifted Black-Body curve 804. In this case, the optimal order of the LED bins 402 is (7 4 5 8 3 6 2)$_n$. The color differences Δu', Δv' are also smaller than 0.002.

Figure 11:
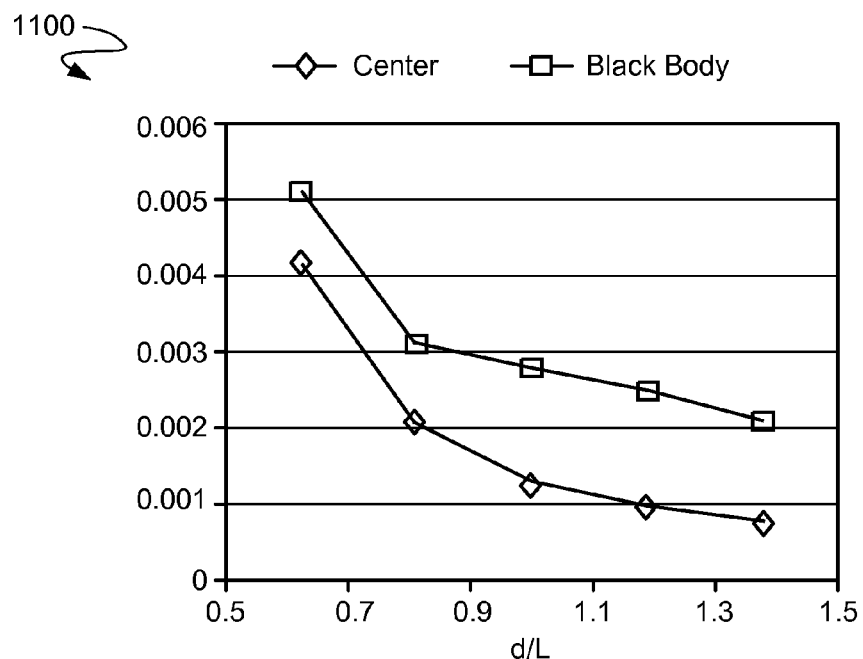
FIG. 11 illustrates simulated worst color differences for an eight-bin panel as a function of the normalized distance d/L from the LEDs in the active area.

Referring now to FIG. 11, therein is shown the simulated worst color differences 1100 for an eight-bin panel 104 (FIG. 2) as a function of the normalized distance d/L from the LEDs 306 (FIG. 6) in the active area 206 (FIG. 6). The worst color difference Δ is defined as $\Delta = \sqrt{\Delta u'^2 + \Delta v'^2}$ since the brightness is assumed to be nearly uniform in the panel 104. FIG. 11 then shows that the worst color difference falls into an acceptable range when the distance d in the active area 206 is comparable to or greater than the distance L between adjacent LEDs.

Figures 12A, 12B:
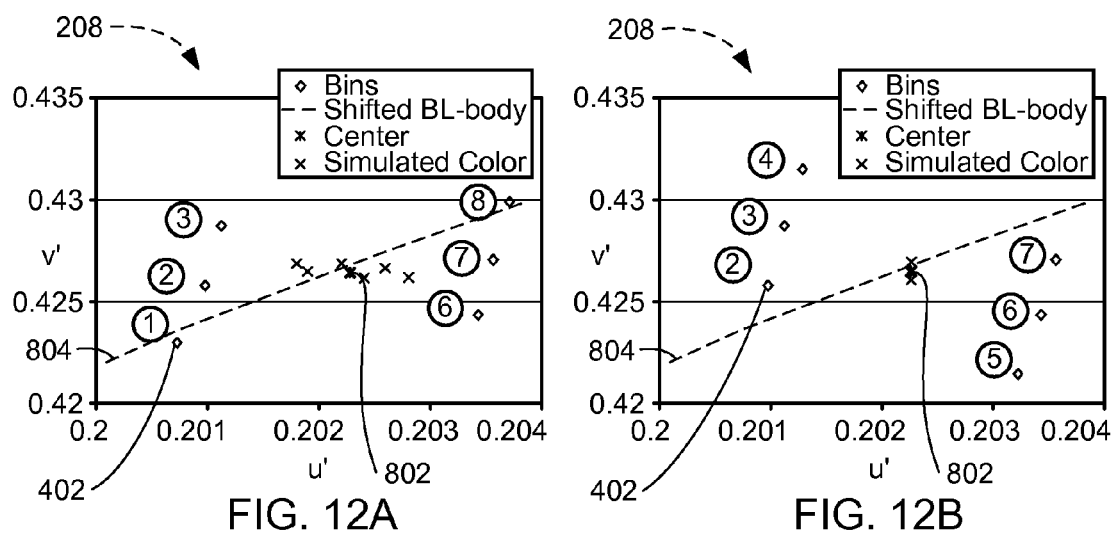
FIGS. 12A, 12B, 13A, and 13B illustrate embodiments of the present invention with optimized six color bin configurations in the near field.
Figure 13A:
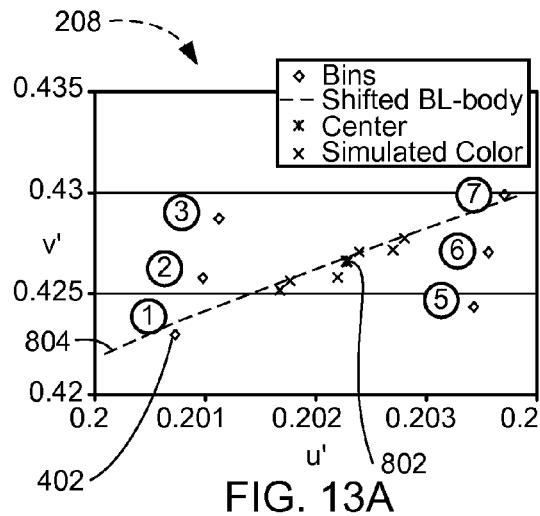
Figure 13B:
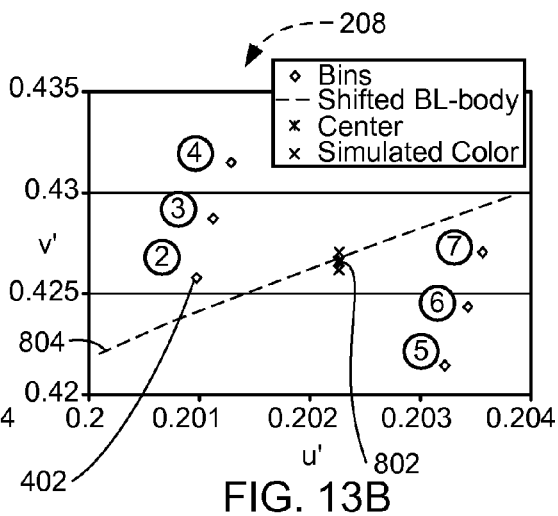

The present invention includes embodiments in addition to the above eight-bin embodiments. It extends to other numbers of bins wherein the optimal color difference is generally smaller than the color uniformity requirements for the panel configuration at hand. Thus, referring now to FIGS. 12A, 12B, 13A, and 13B, therein are shown embodiments with optimized six-bin configurations in the near field 208 (σ=1). The optimization method in FIGS. 12A and 12B is to minimize the distance from the center. The optimization method in FIGS. 13A and 13B is to minimize the distance from the Black-Body curve. FIGS. 12A, 12B, 13A, and 13B show that the color differences on the six-bin panels follow similar behaviors to the eight-bin panels (above). In these particular six bin embodiments, the color uniformity is actually slightly better than the optimized eight-bin configurations. The color differences Δu', Δv' are smaller than 0.001 when the distance in the active area is comparable to or greater than the distance L between adjacent LEDs. Likewise, the theoretical average white point variation from panel to panel is expected to be smaller than 0.001 even though the individual six color bins 402 are different.

Figure 14A:
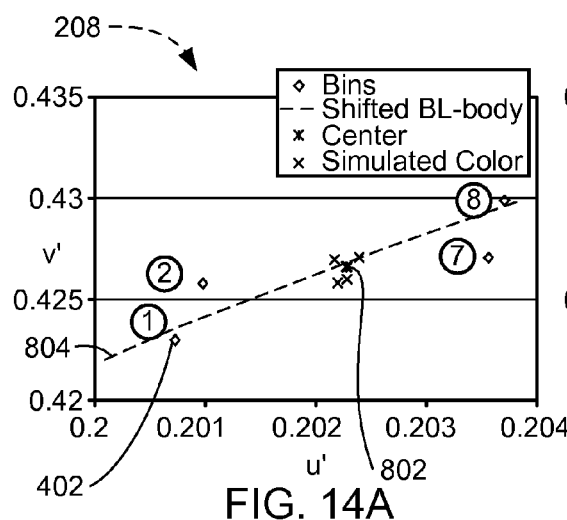
FIGS. 14A and 14B illustrate embodiments of the present invention with optimized four color bin configurations in the near field.
Figure 14B:
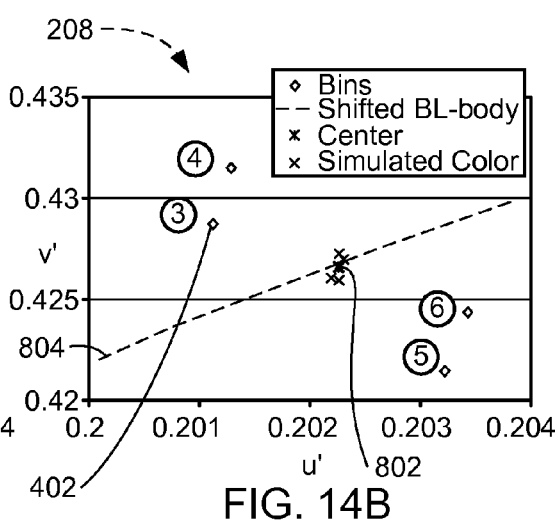

Referring now to FIGS. 14A and 14B, therein is shown an optimization embodiment with four color bins 402, in the near field 208. The optimization method is to minimize the distance from the center. The color uniformity of this embodiment is actually slightly better than that of the optimized six bin embodiments above.

Figure 15A:
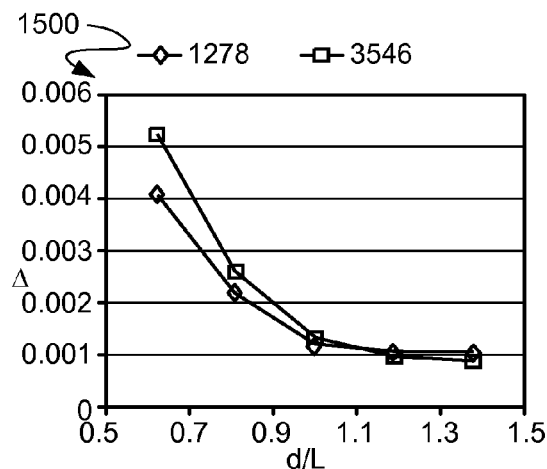
FIGS. 15A and 15B illustrate worst color differences for several four-bin panel configurations as a function of the normalized distance d/L from the LEDs.
Figure 15B:
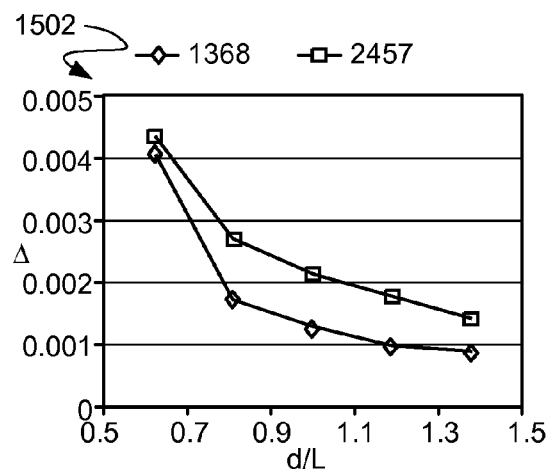

Referring now to FIGS. 15A and 15B, therein is shown the worst color differences for several four-bin panel configurations as a function of the normalized distance d/L from the LEDs 306 (FIG. 6) in the regions where the distance in the active area 206 (FIG. 6) is comparable to the distance L between adjacent LEDs.

Figure 16:
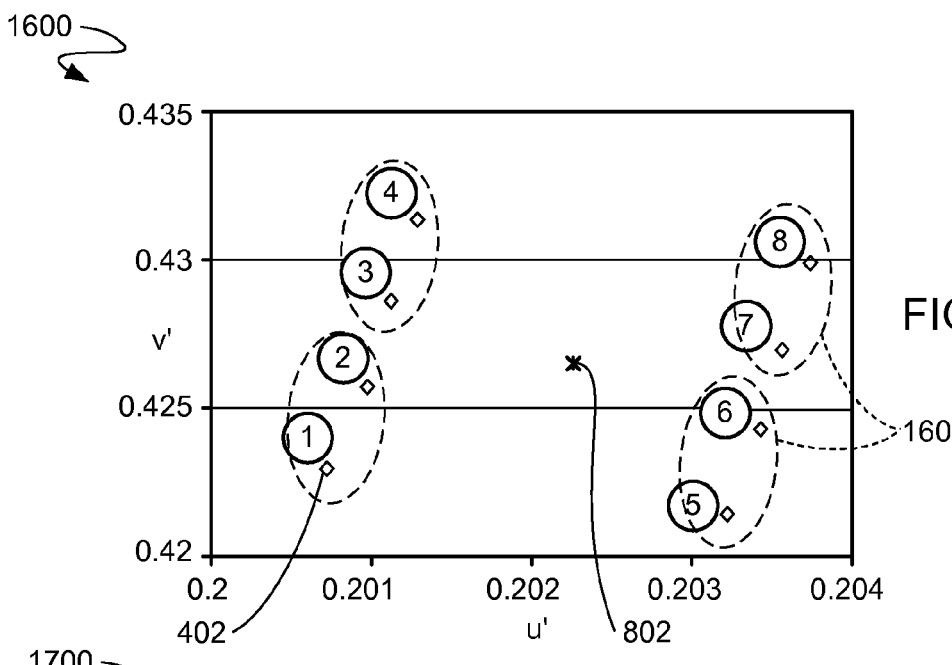
FIG. 16 shows an embodiment for a four-bin simulation configuration that utilizes eight actual color bins.

Referring now to FIG. 16, therein is shown an embodiment of the present invention for a four-bin simulation configuration 1600 that utilizes eight actual color bins 402 in the four-bin simulation. The eight color bins are first split into four zones 1602, and the simulation according to the present invention is performed using each zone rather than each bin. In one embodiment, in order to achieve a consistent far field white point, one color bin 402 from each zone 1602 is accordingly picked to ensure that the color deviation in the far field 210 (FIG. 2) is small. The LEDs selected from the bins 402 in the zones 1602 in this fashion thus have the characteristics of having been selected by picking one color bin 402 from each zone 1602.

Based upon these teachings, it will now be clear to persons of skill in the art that other multi-bin embodiments can similarly be optimized according to the present invention. For example, acceptable three bin or five bin configurations can be built from acceptable four-bin configurations by removing any one bin or adding any other bin, as long as the deviation from the center point at the far field is acceptable according to the target display parameters under consideration.

To illustrate this versatility, computer simulations as taught herein optimized the order of LEDs for 3-bin, 4-bin, 6-bin, and 8-bin color mixing and the corresponding LED backlight units for 13.3" LCD modules. Table I (below) lists the measured white color coordinates (both CIE 1931 and CIE 1976) of center points in 18 actual LCD modules constructed with optimized LED color mixed backlight units in accordance therewith. The colors of the center points in these modules correspond with the colors of the far field simulations. The measured far field data (x, y, u', v') confirms that the color on the panels is consistent (i.e., that the color variation from panel to panel is small). After such LED color mixing, the color difference $\Delta$ becomes less than 0.002 compared to the color differences of the LED color bins $\Delta \sim 0.008$, which agrees with the simulation results.

TABLE I

| Panel | Number of Color Bins | x | y | u' | v' |
|---|---|---|---|---|---|
| A | 3 | 0.2861 | 0.3023 | 0.1890 | 0.4252 |
| B | 3 | 0.2850 | 0.3012 | 0.1886 | 0.4244 |
| C | 3 | 0.2846 | 0.3043 | 0.1872 | 0.4211 |
| D | 3 | 0.2835 | 0.3010 | 0.1876 | 0.4221 |
| E | 4 | 0.2824 | 0.3023 | 0.1863 | 0.4192 |
| F | 4 | 0.2830 | 0.3009 | 0.1873 | 0.4214 |
| G | 4 | 0.2829 | 0.3030 | 0.1864 | 0.4194 |
| H | 4 | 0.2851 | 0.3041 | 0.1876 | 0.4221 |
| I | 4 | 0.2835 | 0.3029 | 0.1869 | 0.4205 |
| J | 4 | 0.2843 | 0.3026 | 0.1876 | 0.4220 |
| K | 4 | 0.2858 | 0.3033 | 0.1884 | 0.4239 |
| L | 4 | 0.2837 | 0.3011 | 0.1877 | 0.4223 |
| M | 4 | 0.2840 | 0.3008 | 0.1880 | 0.4231 |
| N | 6 | 0.2847 | 0.3019 | 0.1881 | 0.4233 |
| O | 6 | 0.2826 | 0.3011 | 0.1869 | 0.4205 |
| P | 6 | 0.2843 | 0.3024 | 0.1877 | 0.4222 |
| Q | 8 | 0.2831 | 0.3025 | 0.1867 | 0.4202 |
| R | 8 | 0.2853 | 0.3030 | 0.1881 | 0.4233 |

Figure 17:
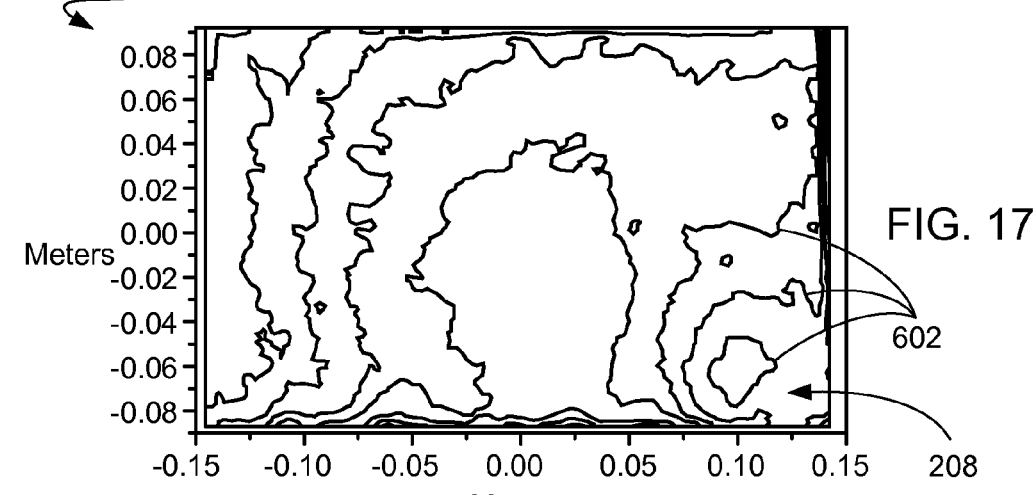
FIG. 17 shows the color uniformity in a representative 13.3" LCD module for an optimized 8-bin LED mixing backlight unit according to an embodiment of the present invention.
Figure 18:
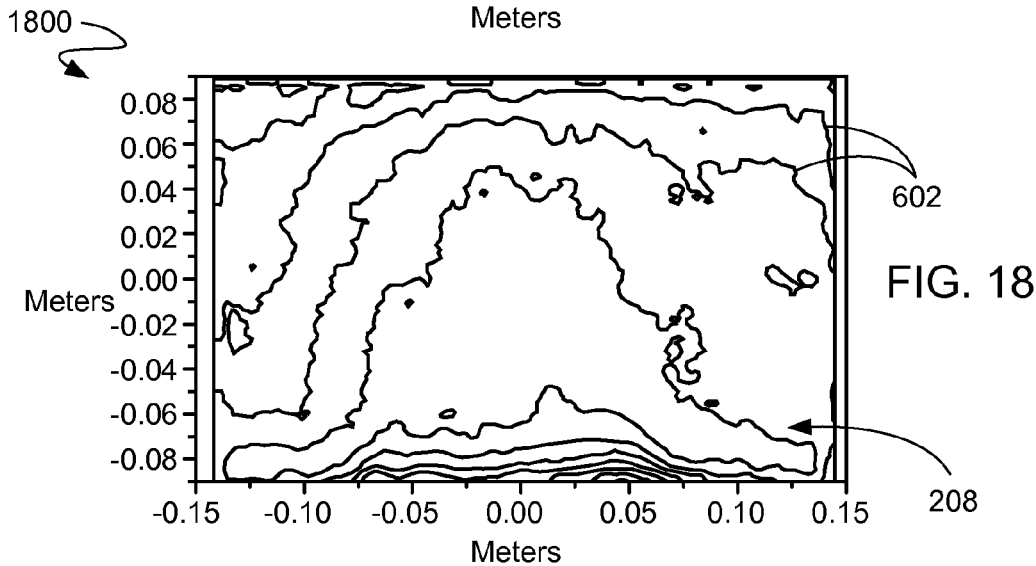
FIG. 18 shows the color uniformity in a representative 13.3" LCD module for an optimized 4-bin LED mixing backlight unit according to an embodiment of the present invention.

Referring now to FIGS. 17 and 18, therein are shown the color uniformities in representative 13.3" LCD modules with optimized LED mixing backlight units optimized according to embodiments of the present invention. FIG. 17 shows the color uniformity 1700 for an optimized 8-bin unit; FIG. 18 shows the color uniformity 1800 for an optimized 4-bin unit. In the near field 208, there is virtually no noticeable color difference between the LEDs, as predicted in the simulations. Additionally, the color uniformity over the panel is ~0.005 with respect to the center point. This uniformity can be attributed to the brightness uniformity and the angular dependence of the LED color.

Figure 19:
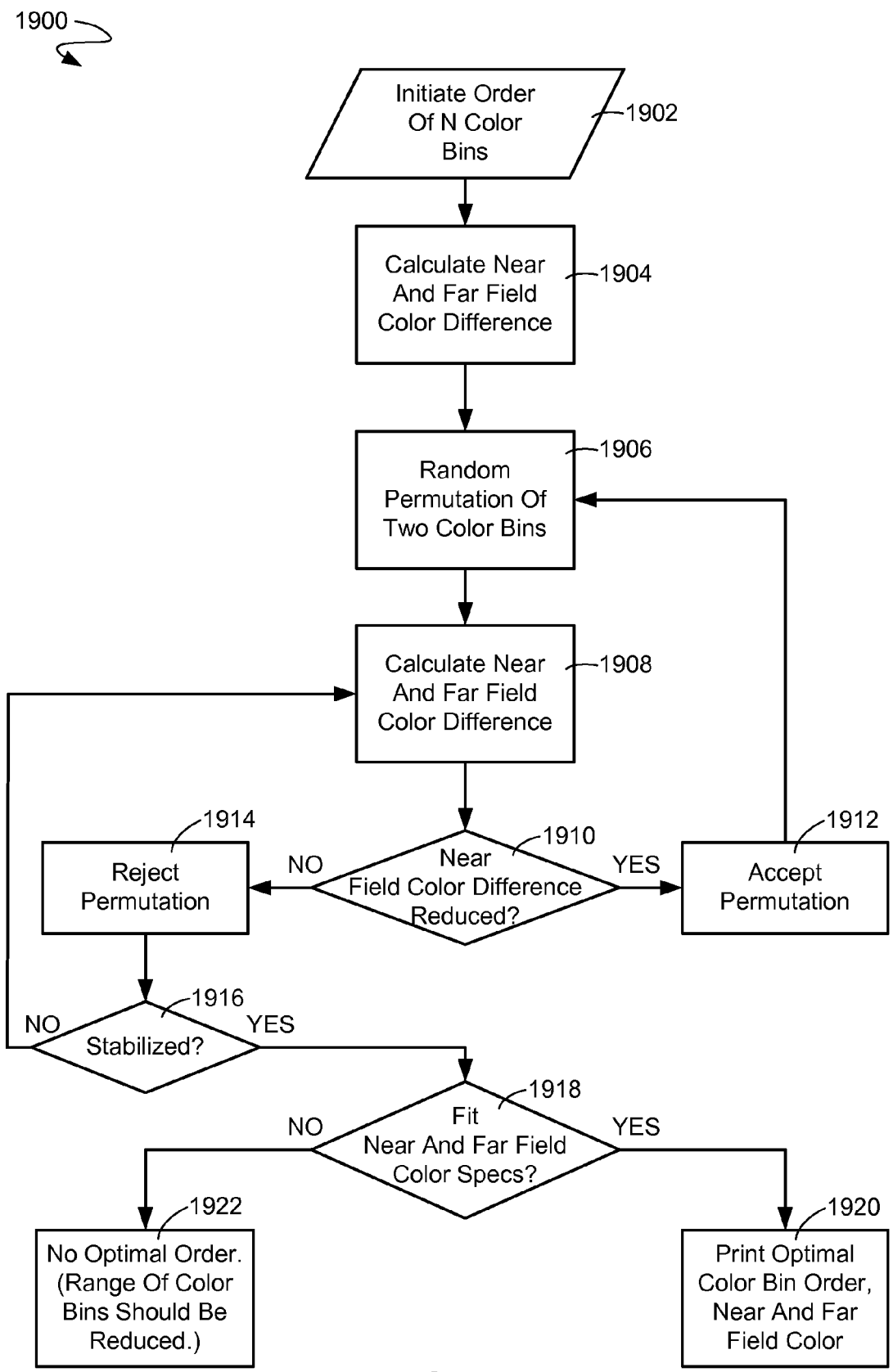
FIG. 19 is a flow chart for an embodiment of a color simulation according to the present invention.

Referring now to FIG. 19, therein is shown a flow chart 1900 for an embodiment of a color simulation, according to the present invention, for determining the order of the bins for selecting the LEDs from the bins for assembly cyclically in that order into a display panel, such as the panel 104 (FIG. 2). Once thus determined, the LEDs are then retrieved from the bins in that number order and assembled cyclically in corresponding order into the display panel light source, such as the removable light strip 202 (FIG. 2) for the panel 104.

As depicted in FIG. 19, for N color bins, an initial order of the N color bins is initiated, such as randomly, in a block 1902. Then, in a block 1904, the near field and far field color differences of the order of N color bins are calculated as described above. Next, two of the color bins are randomly permutated, in a block 1906. Then, in a block 1908, the near field and far field color differences are again calculated. Next, in a block 1910, a determination is made if the near field and far field color difference of the permutated bins is reduced from the near field and far field color difference of the order of N color bins. Then, if the color difference was reduced, the permutation is accepted in a block 1912 and the procedure returns to block 1906. If the color difference was not reduced, the permutation is rejected in a block 1914 and the procedure advances to block 1916. Then, in block 1916, based upon the rejection of the permutation, a determination is made if the calculation of the near field and far field color difference is stabilized, and if not, the procedure returns to block 1908. If it has stabilized, the procedure advances to block 1918. Then, in block 1918, a determination is made if the near field and far field colors meet predetermined specifications. Then, if the near field and far field predetermined color specifications are met, the optimal bin order, the near field color, and the far field color are output in a block 1920. And if the near field and far field predetermined color specifications are not met, an output is generated in a block 1922 stating that there is no optimal bin order for this range of color bins, and optionally suggesting that the range of the color bins be reduced. Accordingly, the LEDs, having different white point colors, that are thus selected will have the characteristics of having been selected by means of the flow chart 1900.

Figure 20:
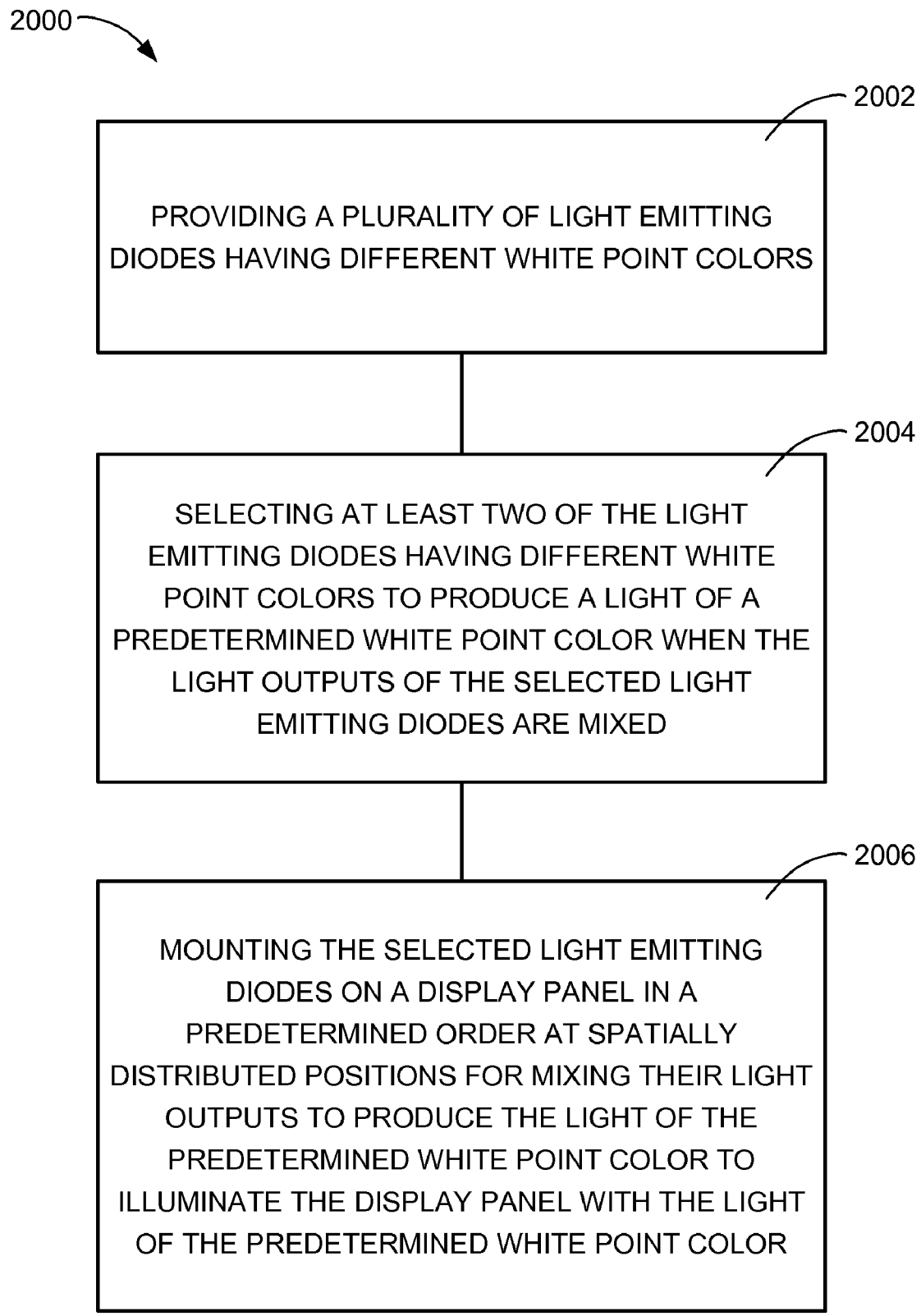
FIG. 20 is a flow chart of an LED backlight method for display systems in accordance with an embodiment of the present invention.

Referring now to FIG. 20, therein is shown a flow chart 2000 of an LED backlight method for display systems in accordance with an embodiment of the present invention. The LED backlight method includes providing a plurality of light emitting diodes having different white point colors, in a block 2002; selecting at least two of the light emitting diodes having different white point colors to produce a light of a predetermined white point color when the light outputs of the selected light emitting diodes are mixed, in a block 2004; and mounting the selected light emitting diodes on a display panel in a predetermined order at spatially distributed positions for mixing their light outputs to produce the light of the predetermined white point color to illuminate the display panel with the light of the predetermined white point color, in a block 2006.

It has been discovered that the present invention thus has numerous aspects.

A principle aspect that has been unexpectedly discovered is that the present invention readily and advantageously enables essentially all of the bins of the white LEDs to be used.

Another important aspect is that all the LEDs can be used while maintaining uniform color output across the entire display production.

Another aspect, accordingly, is that it is now possible to meet color uniformity requirements by mixing LEDs from various color bins.

Yet another important aspect is that the full light output of the LEDs can be delivered to the display panels since filters to compensate for off-white LED outputs are not needed.

Another important aspect is that the full color range that is available to the display panel is preserved because the LCD panel is not compromised by the need to generate a color shift for the LED light source.

Still another aspect is that by carefully selecting the order of the LED color bins for assembling the LEDs in backlight units, the color difference on the backlight units can be well balanced and high color uniformity LED backlights can be achieved.

Yet another important aspect of the present invention is that it advantageously and unexpectedly relaxes the restricted color bin requirement for LED backlights and lowers the costs of LED backlight units.

Still another valuable aspect of the present invention is that it can be effectively applied to and used for both large numbers and small numbers of bins.

Another significant aspect is that the panels not only show high color uniformity over the panels, but also have a consistent color from panel to panel.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the display system of the present invention furnishes important and heretofore unknown and unavailable solutions, capabilities, and functional aspects for utilizing virtually the full range of production LEDs. The resulting processes and configurations are straightforward, cost-effective, uncomplicated, highly versatile and effective, can be surprisingly and unobviously implemented by adapting known technologies, and are thus readily suited for efficiently and economically manufacturing display devices. The resulting processes and configurations are straightforward, cost-effective, uncomplicated, highly versatile, accurate, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An LED backlight method for display systems, comprising:
    providing a plurality of light emitting diodes;
    categorizing the light emitting diodes into bins, wherein each bin references a separate range of white point colors;
    determining an optimal order for at least two light emitting diodes of the plurality, said at least two light emitting diodes having white point colors associated with separate bins, the optimal order of the at least two light emitting diodes for producing a light of a predetermined white point color when the light outputs of the at least two light emitting diodes are mixed; and
    mounting the at least two light emitting diodes on a display panel in the optimal order at spatially distributed positions for mixing their light outputs to produce the light of the predetermined white point color to illuminate the display panel with the light of the predetermined white point color.

2. The method as claimed in claim 1 further comprising mounting the light emitting diodes along an edge of the display panel spaced from an active area of the display panel.

3. The method as claimed in claim 2 wherein the light emitting diodes are spaced from each other by a distance similar to their distance from the active area of the display panel.

4. The method as claimed in claim 2 wherein the light emitting diodes are spaced from each other by a distance less than their distance from the active area of the display panel.

5. The method as claimed in claim 2 wherein the light emitting diodes are spaced from each other by a distance greater than their distance from the active area of the display panel.

6. The method as claimed in claim 1 further comprising:
    splitting the plurality of light emitting diodes into zones having multiple bins in each zone, each bin referencing a separate range of white point colors; and
    picking one color bin from each zone.

7. The method as claimed in claim 1 further comprising minimizing near field and far field color differences.

8. The method as claimed in claim 1 wherein determining the optimal order comprises minimizing the distance from a center point.

9. The method as claimed in claim 1 wherein determining the optimal order comprises minimizing the distance from a shifted Black-Body curve.

10. The method as claimed in claim 1 wherein determining an optimal order for at least two light emitting diodes of the plurality further comprises:
    initiating an order of N color bins;
    then calculating the near field and far field color difference of the order of N color bins;
    then randomly permutating two of the color bins;
    then again calculating the near field and far field color difference;
    then determining if the again-calculated near field and far field color difference is reduced from the near field and far field color difference of the order of N color bins;
    then, if the color difference is reduced, accepting the permutation and returning to the step of randomly permutating two of the color bins;
    otherwise rejecting the permutation;
    then, based upon the rejection of the permutation, determining if the again-calculated near field and far field color difference is stabilized, and if not, returning to the step of again calculating the near field and far field color difference;
    then determining if the near field and far field colors meet predetermined specifications;
    then, if the near field and far field predetermined color specifications are met, outputting the optimal bin order, the near field color, and the far field color; and
    then, if the near field and far field predetermined color specifications are not met, outputting that there is no optimal bin order for this range of color bins and optionally repeating the method with a smaller value of N.

11. An LED backlight for display systems, comprising:
    a plurality of light emitting diodes having different white point colors;
    at least two of the light emitting diodes having different white point colors being selected to produce a light of a predetermined white point color when the light outputs of the selected light emitting diodes are mixed;
    a display panel; and
    the selected light emitting diodes being mounted on the display panel in a predetermined order at spatially distributed positions for mixing their light outputs to produce the light of the predetermined white point color to illuminate the display panel with the light of the predetermined white point color; wherein the predetermined order is generated by comparing a plurality of LED purmutations in order to identify a configuration which minimizes near field and far field color differences within a display system.

12. The backlight as claimed in claim 11 wherein the light emitting diodes are mounted along an edge of the display panel spaced from an active area of the display panel.

13. The backlight as claimed in claim 12 wherein the light emitting diodes are spaced from each other by a distance similar to their distance from the active area of the display panel.

14. The backlight as claimed in claim 12 wherein the light emitting diodes are spaced from each other by a distance less than their distance from the active area of the display panel.

15. The backlight as claimed in claim 12 wherein the light emitting diodes are spaced from each other by a distance greater than their distance from the active area of the display panel.

16. The backlight as claimed in claim 11:
wherein the permutations comprise permutations of light emitting diodes from separate bins, wherein the bins each reference a separate range of white point colors; and
wherein the selected light emitting diodes have the characteristics of being selected from at least two different such bins.

17. The backlight as claimed in claim 11 further comprising at least three of the light emitting diodes, each having a different white point color.

18. The backlight as claimed in claim 11:
wherein the predetermined order is generated by splitting a first set of light emitting diodes into zones having multiple bins in each zone, each bin referencing at least one white point color; and
picking one color bin from each zone.

19. The backlight as claimed in claim 11 wherein the selected light emitting diodes optimize the LED order by minimizing the distance from a center point.

20. The backlight as claimed in claim 11 wherein the selected light emitting diodes optimize the LED order by minimizing the distance from a shifted Black-Body curve.

21. The backlight as claimed in claim 11 wherein at least two of the selected light emitting diodes having different white point colors have the characteristics of having been selected by:
initiating an order of N color bins;
then calculating the near field and far field color difference of the order of N color bins;
then randomly permutating two of the color bins;
then again calculating the near field and far field color difference;
then determining if the again-calculated near field and far field color difference is reduced from the near field and far field color difference of the order of N color bins;
then, if the color difference is reduced, accepting the permutation and returning to the step of randomly permutating two of the color bins;
otherwise rejecting the permutation;
then, based upon the rejection of the permutation, determining if the again-calculated near field and far field color difference is stabilized, and if not, returning to the step of again calculating the near field and far field color difference;
then determining if the near field and far field colors meet predetermined specifications;
then, if the near field and far field predetermined color specifications are met, outputting the optimal bin order, the near field color, and the far field color; and
then, if the near field and far field predetermined color specifications are not met, outputting that there is no optimal bin order for this range of color bins.

* * * * *

UNITED STATES PATENT AND TRADEMARK OFFICE
CERTIFICATE OF CORRECTION

PATENT NO.      : 7,841,759 B2
APPLICATION NO. : 11/870360
DATED           : November 30, 2010
INVENTOR(S)     : Chen et al.

It is certified that error appears in the above-identified patent and that said Letters Patent is hereby corrected as shown below:

In column 4, lines 8-10, delete ""above,""below,""bottom,""top,""side" (as in "sidewall"), "higher,""lower,""upper,""over,"and "under,"are" and insert -- "above," "below," "bottom," "top," "side" (as in "sidewall"), "higher," "lower," "upper," "over," and "under," are --, therefor.

In column 4, line 48, delete "then" and insert -- than --, therefor.

In column 8, line 1, delete "(6=1)" and insert -- ($\sigma = 1$) --, therefor.

In column 8, line 13, delete "(7 4 5 8 3 6 2)$_n$." and insert -- (7 4 5 8 3 6 2 1 )$_n$. --, therefor.

In column 13, line 3, in Claim 11, delete "purmutations" and insert -- permutations --, therefor.

Signed and Sealed this
Twenty-second Day of November, 2011

David J. Kappos
*Director of the United States Patent and Trademark Office*